United States Patent [19]

Avis et al.

[11] Patent Number: 4,811,420

[45] Date of Patent: Mar. 7, 1989

[54] INITIALIZATION OF COMMUNICATION CHANNEL BETWEEN A SUBSCIBER STATION AND A BASE STATION IN A SUBSCRIBER COMMUNICATION SYSTEM

[75] Inventors: Graham M. Avis; Thomas E. Fletcher; Gregory T. Saffee, all of San Diego, Calif.

[73] Assignee: International Mobile Machines Corporation, Philadelphia, Pa.

[21] Appl. No.: 70,970

[22] Filed: Jul. 8, 1987

[51] Int. Cl.$^4$ ............................................. H04B 1/00
[52] U.S. Cl. ...................................... 455/51; 455/32; 379/63
[58] Field of Search ..................... 340/825.54; 455/32, 455/34, 51; 379/63

[56] References Cited

U.S. PATENT DOCUMENTS

| | | | |
|---|---|---|---|
| 4,675,863 | 6/1987 | Paneth et al. | 379/59 |
| 4,682,367 | 7/1987 | Childress et al. | 455/32 |
| 4,691,202 | 9/1987 | Denne et al. | 340/825.54 |
| 4,696,051 | 9/1987 | Breeden | 455/51 |
| 4,701,944 | 10/1987 | Howard et al. | 379/63 |
| 4,723,264 | 2/1988 | Sasuta et al. | 379/63 |

*Primary Examiner*—John W. Caldwell, Sr.
*Assistant Examiner*—Tyrone Queen
*Attorney, Agent, or Firm*—Arthur A. Jacobs; Edward W. Callan

[57] ABSTRACT

A subscriber communication system includes a base station in a network with a plurality of subscriber stations, wherein control information is communicated between the base station and the subscriber stations over a radio control channel (RCC) at a frequency selected by the base station from a plurality of predetermined frequencies. The a base station transmits control messages including a unique network number over the RCC. Each subscriber station processes the network number in the control message received over the RCC to enable the subscriber station to process the control message in accordance with whether the subscriber station is in the same network as the base station. The timing of communications transmitted by a subscriber station over a given communication channel between a base station and the subscriber station is refined upon initial establishment of the communication channel. Both DC signaling information and voice data signals are communicated over an assigned channel between a line appearance that couples a base station to a central office and a line interface that couples a subscriber station to a subscriber terminal.

17 Claims, 5 Drawing Sheets

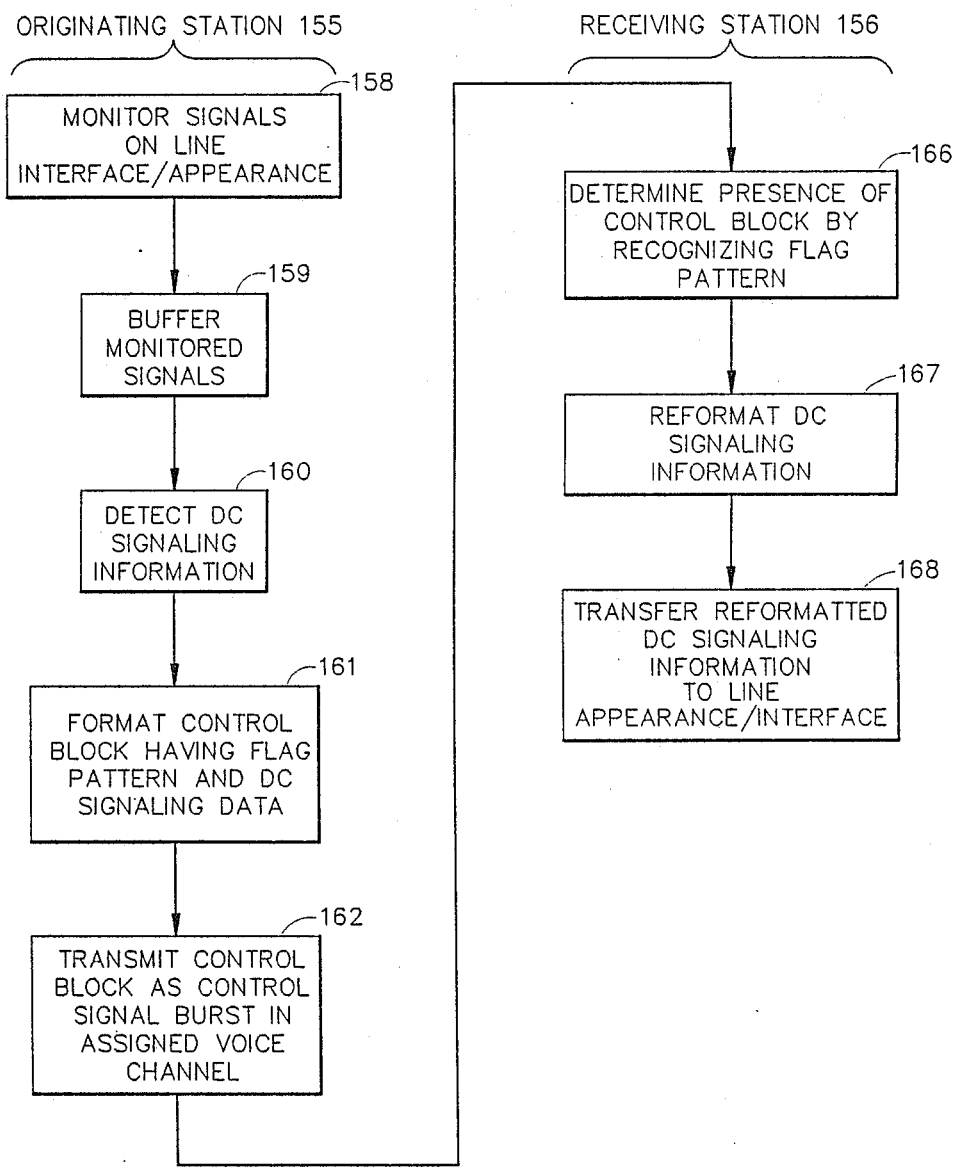

INITIALIZATION OF COMMUNICATION CHANNEL BETWEEN A SUBSCIBER STATION AND A BASE STATION IN A SUBSCRIBER COMMUNICATION SYSTEM

BACKGROUND OF INVENTION

The present invention generally pertains to subscriber communication systems and is particularly directed to initialization of a communication channel between a subscriber station and a base station in such a system.

A prior art subscriber communication system is described in U.S. Pat. No. 4,675,863, issued June 23, 1987, for "Subscriber RF Telephone System For Providing Multiple Speech And/Or Data Signals Simultaneously Over Either A Single Or A Plurality Of RF Channels".

SUMMARY OF THE INVENTION

The present invention provides a subscriber communication system in which a base station is included in a network with a plurality of subscriber stations, and wherein control information is communicated between the base station and the subscriber stations over a radio control channel (RCC) at a frequency selected by the base station from a plurality of predetermined frequencies. The base station transmits control messages over the RCC. The control messages include a network number unique to the base station. Each subscriber station processes the network number in the control message received over the RCC to enable the subscriber station to process the control message in accordance with whether the subscriber station is in the same network as the base station.

Each subscriber station also is operable in a search mode wherein it searches for the RCC frequency by sequentially transmitting an RCC acquisition message at each of the predetermined frequencies, with each of the acquisition messages including an identification number that is unique to the subscriber station. The base station processes the subscriber identification number in an acquisition message received over the RCC to determine whether the subscriber station is in the same network as the base station; and transmits an acknowledgement to the subscriber station that the RCC has been acquired by the subscriber station when such processing of the subscriber identification number indicates that the subscriber station is in the same network as the base station.

The present invention also provides a subscriber communication system, in which the timing of communications transmitted by a subscriber station over a given communication channel between a base station and the subscriber station is refined upon initial establishment of the communication channel. The base station includes a master clock for providing a system timing signal. The subscriber station includes an internal timing generator for generating a subscriber station timing signal for timing the signals that are transmitted over the given communication channel from the subscriber station to the base station; and provides a refinement signal indicating the timing of the internal timing signal. Upon initial establishment of a communication channel between the base station and the subscriber station, the subscriber station transmits the refinement signal over the given communication channel from the subscriber station to the base station; and the base station processes the refinement signal received from the subscriber station in relation to the system timing signal to determine the value of any offset between the timing of the system timing signal and the timing of the refinement signal. The base station communicates the determined offset value to the subscriber station; and the subscriber station processes the offset value communicated from the base station to adjust the subscriber station timing signal to reduce the offset.

The present invention further provides a subscriber communication system wherein both DC signaling information and voice data signals are communicated over an assigned channel between a line appearance that couples a base station to a central office and a line interface that couples a subscriber station to a subscriber terminal. The system processes DC signaling information for communication over the assigned channel between the line appearance and the line interface by detecting DC signaling information on the line appearance and/or on the line interface and conditions the detected DC signaling information for communication over the assigned channel in lieu of the voice data signals.

Additional features of the present invention are described in relation to the description of the preferred embodiments.

BRIEF DESCRIPTION OF THE DRAWING

FIG. 4 illustrates processing routines for transmitting DC signalling information over an assigned voice data communication channel.

GLOSSARY OF ACRONYMS

BBP: Base Band Processor
CCT: Channel Control Task
CCU: Channel Control Unit
CRC: Cyclic Redundancy Check
EEPROM: Electrically Erasable Programmable Read Only Memory
FT: Fractional Timing
MUX: Multiplexer Unit
NID: Network Identification Number
PCM: Pulse Code Modulation
RCC: Radio Control Channel
RELP: Residual-Excited Linear Prediction
RF: Radio Frequency
RPU: Remote-Connection Processing Unit
RUW: Refinement Unique Word
SCT: Subscriber Control Task
SID: Subscriber Identification Number
SSB: Switch-hook State Buffer
TDM: Time Division Multiplexed
UW: Unique Word
VCU: Voice Codec Unit

DESCRIPTION OF THE PREFERRED EMBODIMENT

Figure 1:
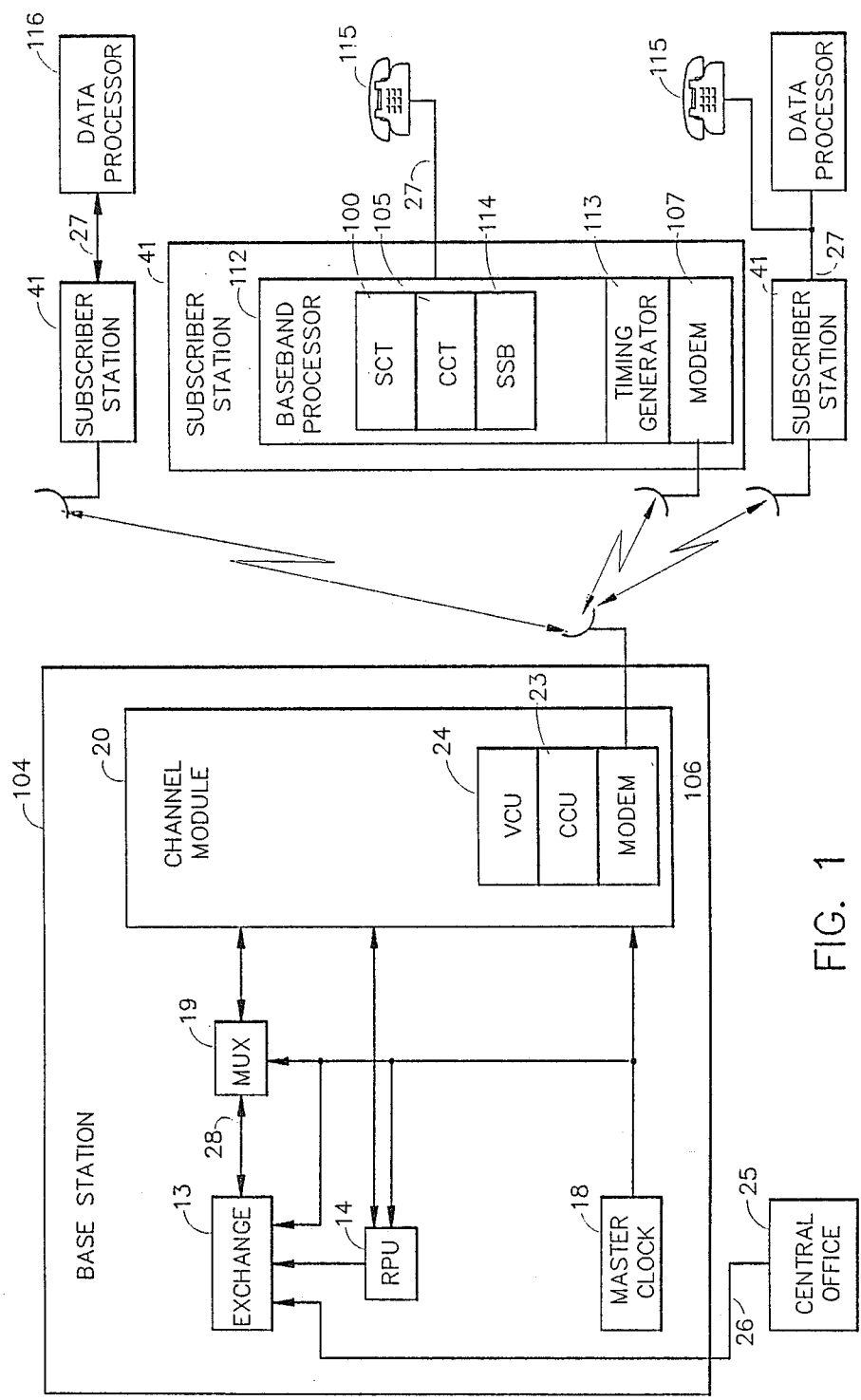
FIG. 1 is a block diagram of a preferred embodiment of the subscriber communication system of the present invention.

Referring to FIG. 1, one preferred embodiment of the subscriber communication system of the present invention includes a base station 104 and a plurality of subscriber stations 41. This preferred embodiment is useful with a base station described in U.S. patent application Ser. No. 071,279 filed on even data herewith entitled "Base Station For Wireless Digital Telephone System" now U.S. Pat. No. 4,777,633; and the same reference numerals are used in both said application and herein to designate common components.

The base station 104 includes an exchange 13, a remote-connection processing unit (RPU) 14, a master clock 18, a multiplexer unit (MUX) 19 and a channel module 20. The exchange 13 is coupled to a central office 25 by a plurality of two-wire line appearances 26. The exchange 13 is coupled to the channel module by a T1 trunk 28 and the MUX 19. The MUX 19 multiplexes different communication channels in different time slots on the T1 trunk 28. The channel module 20 includes a channel control unit (CCU) 23, a voice codec unit (VCU) 24, and a modem 106. The CCU 23 places communication channels in different radio frequency (RF) channels. The VCU 24 conditions voice communication signals carried over the communication channels. The modem 106 enables transmission and reception of voice and data communication signals over an assigned RF channel. The CCU 23 transfers communication signals between the assigned RF communication channel and the assigned communication channel in an assigned time slot on the T1 trunk 28. The RPU 14 monitors the status of the time slots on the T1 trunk 28 and the status of the Rf channels and then assigns communication channels to predetermined time slots and predetermined RF channels in accordance with a predetermined assignment routine. The CCU 23 exchanges control messages with the subscriber stations 41 over a radio control channel (RCC) in a given time slot of a predetermined RF channel.

Each subscriber station 41 includes a modem 107, a baseband processor 112 and an internal timing generator 113. The baseband processor 112 is coupled by a two-wire interface line 27 to a subscriber terminal, such as a telephone 115 and/or a data processor 116. The baseband processor 112 includes two software-implemented modules, a subscriber control task (SCT) module 100 and a channel control task (CCT) module 105. The CCT 105 is responsible for word synchronization and framing, detection and resolution of collisions, and error detection. The CCU 23 and all CCTs 105 that are listening on the RCC must exhaustively check for a valid RCC message in every RCC slot. The CCT 105 performs this task by scanning for a unique word (UW) in a window ±4 symbols about a nominal UW location, based upon master system timing. The CCU 23 listening on the RCC scans for the unique word in a window ±3 symbols about the nominal UW location. A search algorithm shifts the data until it finds the UW pattern, or until all possibilities have been exhausted. Once the UW pattern is found, the RCC message is considered valid only if an RCC checksum is correct.

The SCT 100 implements an RCC frequency search algorithm. The purpose of the RCC search is to allow the subscriber station 41 to find the base station 104 of the same network as the subscriber station 41 as quickly as possible, and to prohibit the subscriber station 41 from attempting to communicate with known incorrect networks. Each base station 104 has a unique network identification number (NID). Each subscriber station 41 has a unique 24-bit subscriber identification number (SID). The SID is stored in an EEPROM in the subscriber station 41. All the SID's in a particular network are stored in the network database at the base station 104.

The RCC search is either active or passive. The active RCC search is only executed when a call origination is pending. A subscriber station 41 is accepted into a network and determines its NID only through the active search. When a call origination is not pending, the unit executes a passive search utilizing its known home NID to reacquire the correct RCC channel.

If all of the possible RCC frequencies have been tried unsuccessfully in either search mode, the SCT 100 attempts a hard reset. This could potentially clear a system fault which is preventing the subscriber station 41 from gaining sync. The hard reset also retrains the modem. Modem training adapts the modem filters to the current environmental conditions. If the handset if off hook when all frequencies have been tried unsuccessfully, the SCT 100 causes a fast busy possible RCC tone to be output to the telephone handset 115.

Each time the SCT 100 performs a reset it reads the SID and NID from the EEPROM. If no NID exists in the EEPROM, it is set to zero by default. When the SCT 100 gains sync on an RCC frequency in a passive search, it compares the received NID to the internally stored NID and reject all RCC frequencies with non-matching NIDs.

The active RCC frequency search is initiated only when a call origination is pending. When the call origination pending status ends, the user hangs up or the unit enters an abort state. Then the active search becomes a passive search. If the SCT 100 has tried all RCC frequencies unsuccessfully, the SCT 100 transitions to an abort state and sends a reorder tone to the handset 115. This clears the call origination pending status and forces the search mode to transition from active to passive. When the SCT 100 determines its network affiliation, the search ends.

The SCT 100 determines the subscriber station network affiliation and NID through the normal call setup procedure. The SCT 100 executes a search of frequencies. Each time the SCT 100 gains sync on an RCC frequency it sends a CALL REQUEST RCC message. If the base station 104 recognizes the SID it responds with either a CALL CONNECT message if it wishes to complete the call, or a CLEAR INDICATION message with the reorder clearing code if it is too busy to complete the call. In either case, the search ends and the NID in the data field of the RCC message is saved in an EEPROM by the subscriber station 41 for memory retention during power interruptions.

If the base station 104 does not recognize the SID it sends a CLEAR INDICATION message with the unknown subscriber clearing code to the subscriber station 41. The SCT 100 then generates the next frequency on which to search for the RCC. The absence of an Acknowledgment from the base station also forces the SCT 100 to generate the next frequency on which to search. A new frequency also may be requested by the CCT 105 due to a loss of sync.

After having found the correct network, the SCT 100 executes a passive search each time it loses RCC sync, or transitions to the RCC from a voice channel. It also executes the passive search if the network number is not confirmed, but the call origination pending status is clear. If the subscriber station 41 detects an offhook (service request), it begins an active search. The following events cause the SCT 100 to generate the next RCC frequency in the passive search mode: (a) a new frequency request from the CCT 105 due to an AM hole detection failure or a loss of RCC sync; (b) a a return to the control channel from a voice channel; or (c) RCC sync being achieved on the wrong network.

To increase the speed of the passive search the SCT 100 stores up to six frequencies that correspond to its home base station 104. When a search, active or passive, is required, the frequency generaton algorithm alternates between frequencies from a stored table of RCC frequencies and an incrementing frequency counter. This gives priority to the most likely frequencies and speeds up acquistion of the base station after a brief outage.

Each time the SCT 100 gains sync on an RCC it looks for a match between its stored NID and the received NID. If there is no match, the SCT 100 has gained sync on the wrong network, and the SCT 100 generates a new frequency on which to attempt to gain sync. If the NID's do match, then the SCT 100 has located the correct network and the search ends.

Figure 2A:
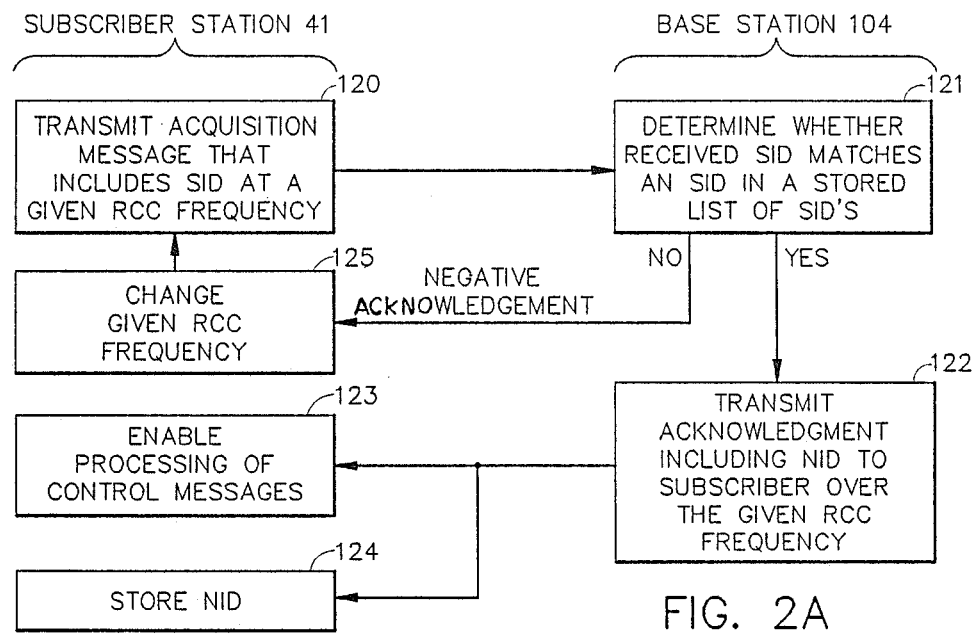
FIGS. 2A and 2B illustrate processing routines for establishing communications between a base station and a subscriber station in the same network as the base station.

The general routines performed in the active search mode are summarized with reference to FIG. 2A. The SCT 100 in the subscriber station 41 performs a routine 120, wherein an acquistion message that includes the SID of the subscriber station 41 is transmitted sequentially on each of the given RCC frequencies that are being used by the base station 104 of the subscriber station's assigned network. The RPU 14 in the base station 104 performs a routine 121 of determining whether the SID contained in the acquistion message received at a given RCC frequency matches an SID in a list of SID's stored in the base station. If the SID in the acquistion message transmitted by the subscriber station matches one of the SID's stored in the base station 104, the base station 104 then performs a routine 122 of transmitting an Acknowledgment message to the subscriber station over the given RCC frequency. The Acknowledgment message includes the NID of the base station. The subscriber station 41 responds to the Acknowledgment message by performing a routine 123 that enables the subscriber station 41 to process control messages. The subscriber station 41 also responds to the acknowledgment message by performing a routine 124 of storing the NID in the subscriber station memory.

If the SID in the acquisition message transmitted by the subscriber station does not match any of the SIDs stored in the base station 104, the base station 104 transmits a Negative Acknowledgment message to the subscriber station over a given RCC frquency. Upon receipt of a Negative Acknowledgment message, the subscriber station 104 performs a routine 125 of changing the given RCC frequency and then repeats the routine 120 of transmitting an acquisition message at the changed given RCC frequency.

Figure 2B:
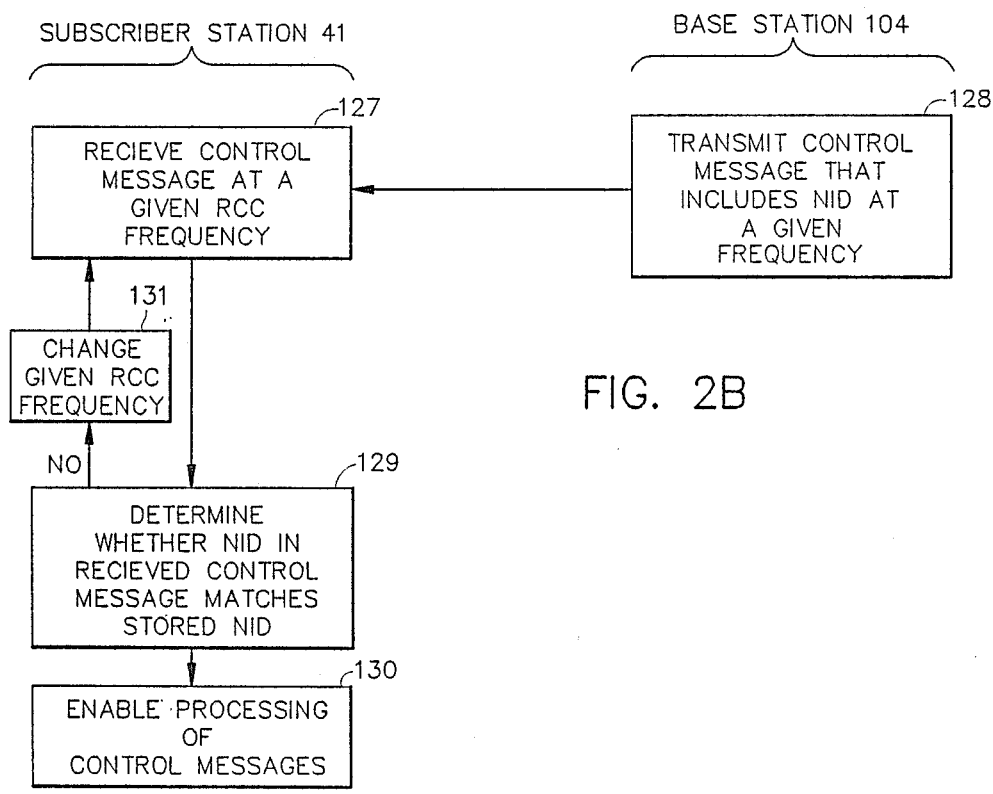

The general routines performed in the passive search mode are summarized with reference to FIG. 2B. The subscriber station 41 performs a routine 127 of sequentially receiving control messages transmitted over each of the RCC frequencies used in the network to which the subscriber station is assigned. At a given RCC frequency, the base station 104 performs a routine 128 of transmitting a control message that includes the NID.

For a control message received at a given RCC frequency, the subscriber station 41 performs a routine 129 of determining whether the NID in a received control message matches the NID stored in the subscriber station. If the NID's match, the subscriber station 41 performs a routine 130 that enables the subscriber station 41 to process the control messages from the base station 104. If the NID's do not match, the subscriber station 41 performs a routine 131 of changing the given RCC frequency at which the subscriber station receives control messages; and the routine 129 of comparing the NIDs is repeated.

Timing refinement is performed at the beginning of every voice connection made over the assigned communication channel. The intent is to fine tune the subscriber station's transmit symbol timing to bring it to within ±3% of the base station's master symbol clock.

To achieve a ±3% tolerance, fractional timing offset values "$\Delta$ t's" are gathered over a number of frames at the subscriber station. Each transmit burst from the base station provides another data point in the list of fractional time offset-value samples. Periodically, the sample mean "mean $\Delta$ t" is computed to generate an estimate of the actual fractional time offset. This estimate is used to adjust the subscriber station internal timing generator to bring it closer to the desired value. This process is continued until the base station detects that the subscriber station timing is within ±3% of the correct symbol timing value.

The base station CCU 23 automatically enters refinement operation when it is assigned a voice channel. The CCU 23 instructs the modem 106 to initiate the refinement operation and proceeds to transmit refinement bursts. Each burst contains power, symbol timing and fractional timing information for the subscriber station 41.

The base station CCU 23 successfully receives a subscriber refinement burst if a refinement unique word (RUW) is found and the CRC is verified as correct. If, at any time, the base station CCU 23 is unsuccessful in receiving a subscriber burst, the next base station transmit burst contains a null for symbol timing. Furthermore, if the base station determines that the link quality of a subscriber burst has dropped below a predetermined level, the base station indicates this in a command byte to the subscriber station by setting an "Ignore FT" bit. The subscriber station then discards the fractional time information contained in the burst.

The refinement operation is terminated successfully when the base station reads three successive fractional time values within ±3% of the master timing signal from the master clock 18. Successful refinement termination is signalled to the subscriber station via the command byte by setting a "StopRef" bit. The subscriber station acknowledges the termination by clearing a "ContRef" bit on the next reverse channel burst. The subscriber station then enters voice operation. Upon detecting the acknowledegment, the base station enters voice operation.

Refinement is aborted by the base station after 67 frames (3.0 seconds) if the ±3% goal has not been reached. This is signalled to the subscriber station via the command byte by setting an "AbortRef" bit. Abort refinement is acknowledged by the subscriber station in the same manner as stop refinement. The subscriber station then tears down the voice channel. Upon detecting the acknowledgement, the base station tears down the voice channel.

The base station transmits the terminating command a second time if it is unsuccessful in receiving the subscriber station's acknowledgement after the first transmission (i.e. RUW not found or bad CRC). If the base station is still unsuccessful in receiving the subscriber station's acknowledgement after the second transmission, it automatically enters voice operation if it has transmitted a "StopRef" bit, or tears down the voice channel if it has transmitted an "AbortRef" bit.

The subscriber CCT 105 automatically enters refinement operation upon receiving a voice channel assignment. As base station refinement bursts are received, the subscriber station uses the contents of a "Pwr" byte to correct its transmit power and a fractional timing byte to correct its symbol timing.

The fractional timing offset values (Δ t's) received from base station are stored as they arrive. Once five value values are collected, the subscriber computes a sample variance to determine their spread. Should the variance be too large, additional samples are collected. Once the variance is small enough, or when the valid sample count reaches 16, the sample mean (mean Δ t) is computed and used to adjust the fractional timing signal transmitted to the base station. Following the adjustment, the buffering operation is repeated once again.

The subscriber station CCT 105 successfully receives a base station refinement burst if the RUW is found and the CRC is verified correct. The subscriber station ignores base station bursts that are not successfully received. The subscriber station also ignores fractional timing values when commanded to do so by the base station. There is only one instance when the subscriber station ignores the power value within the burst. This is the power value within the first successfully received burst (i.e. this power adjustment could cause a "spike" effect on the next reverse channel burst).

The refinement operation terminates successfully under command from the base station. Voice operation begins immediately after the subscriber station acknowledges the base station's terminating command.

Refinement is aborted after 67 frames (3 seconds) under command from the base station. In this case, the voice channel is torn down immediately after acknowledging the command from the base station. The subscriber station aborts refinement on its own after receiving 77 frames (3.5 seconds) of bad refinement bursts. This timing skew allows the subscriber station to receive the "AbortRef" command before timing out and tearing down the voice channel.

Prior to a fractional timing adjustment at the subscriber station 41, the sample variance must drop below a threshold. The determination of this threshold is somewhat arbitrary, but the following analysis provides us with a plausible threshold value.

It is a fact 75% of all samples in a random process lie within two standard deviations of the mean. Hence, if twice the computed standard deviation is found to be in the interval [−5%,+5%], one knows that 75% of the samples are within 5% of the sample mean. This provides reasonable confidence that the sample mean is accurate and can be used for the feedback adjustment.

Since the adjustment step size is T/200, where T is a symbol time, the interval [−5%,+5%] corresponds to [−10,+10] in incremental steps. Hence the standard deviation must lie in the interval [−5,+5], or, equivalently, the sample variance must be less than 25. Sample variance is easier to calculate than standard deviation, so it is used in the actual implementation. The formula is:

$$V^2 = \left\{ \sum_{i=1}^{n} (\Delta t_i - \text{mean } \Delta t)^2 \right\} / (n-1) \quad [\text{Eq. 1}]$$

"V" is the sample variance.
"$\Delta t_i$" is the i - th calculated fractional time offset value sample.
"n" is the sample size
"mean Δ t" is the calculated mean Δ t for n samples.

The approach to refinement described herein permits the acceleration of the operation under good conditions, while providing robust operation under adverse conditions. If fractional time estimates are good, refinement is completed within 4 frames (180 ms). Under less ideal conditions, a full 16 frame average might need to be computed, taking about 19 frames (855 ms). Worst case conditions could drive the algorithm to its upper bound of 67 frames (3 seconds), but it seems unlikely that voice operation would even be possible under such extreme circumstances (i.e. that is why refinement is aborted if the maximum count is reached).

Figure 3:
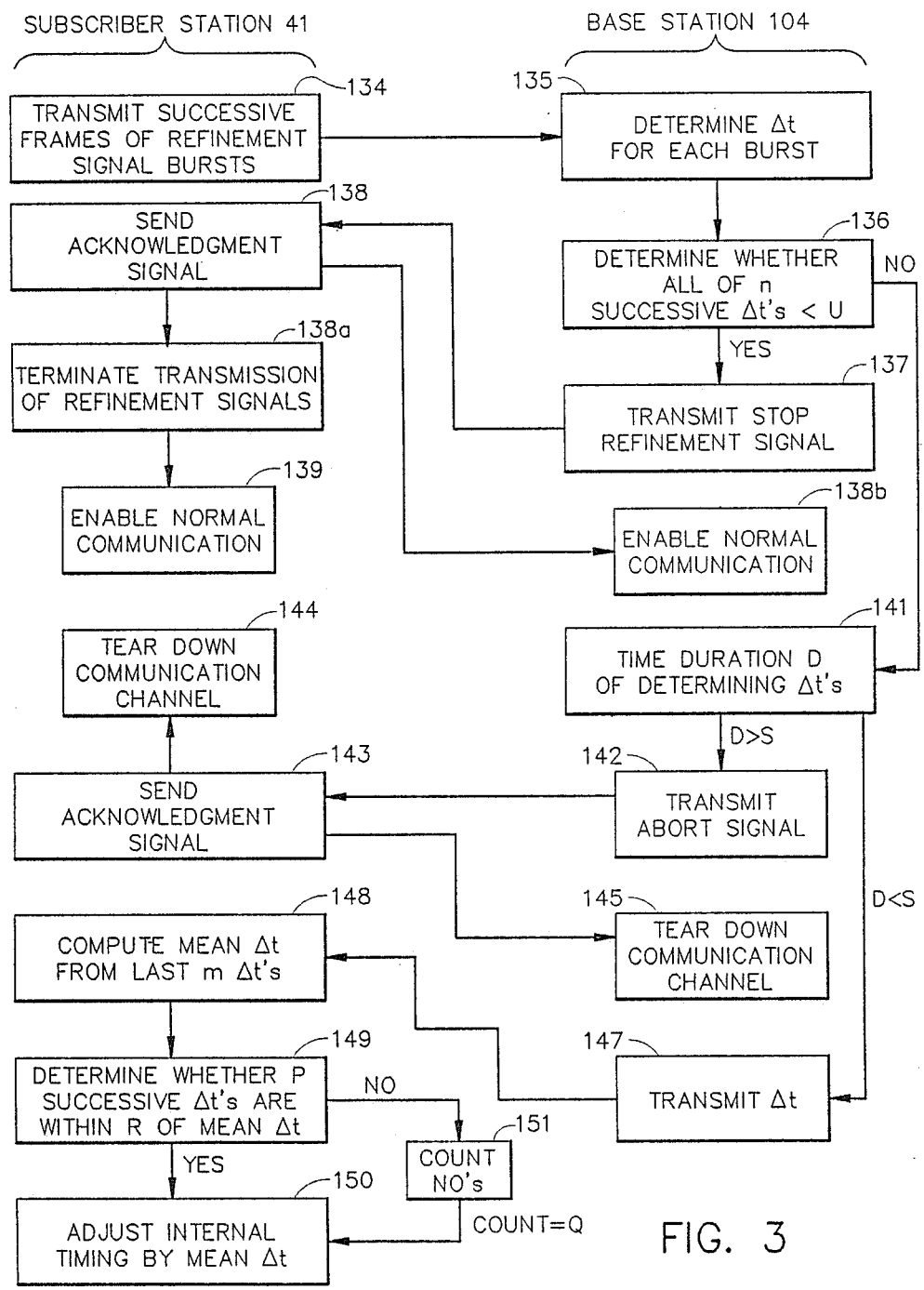
FIG. 3 illustrates processing routines for refining the timing of subscriber station signal transmisssions to the base station.

The general routines performed by the base station 104 and the subscriber station 41 to accomplish timing refinement are summarized with reference to FIG. 3. The subscriber station 41 performs a routine 134 of transmitting successive frames of refinement signal bursts that are timed by the internal timing generator 113.

The base station RPU 14 performs a routine 135 of processing each received refinement signal burst in relation to the system timing signal from the master clock 18 to determine an offset value Δ t for each burst between the timing of the system timing signal and the timing of the refinement signal.

The base station CCU 23 performs a routine 136 of determining whether a predetermined number "n" of successively determined offset values Δ t are below a predetermined value "U". When the base station CCU 23 determines that a predetermined number "n" of successively determined offset values Δ t are below the predetermined value "U", it performs a routine 137 of transmitting a Stop Refinement signal to the subscriber station 41. The BBP 112 in the subscriber station 41 responds to the Stop Refinement signal by performing a routine 138 that terminates transmission of the refinement signal that sends an Acknowledgement signal back to the base station, and by then performing a routine 138a. The BBP 112 then performs a routine 139 that enables normal communications over the given communication channel with the base station 104.

The base station CCU 23 responds to the Acknowledgement signal in routine 138 by performing a routine 138b that enables normal communications over the given communication channel with the subscriber station 41.

The base station CCU 23 also performs a routine 141 of timing the duration "D" of the routine 136, wherein it is determined whether all of n successive offset values Δ t's are less than the predetermined value "U". If such a determination has not been made within a predetermined duration "S" (i.e. D>S), the base station CCU 23 performs a routine 142 that transmits an Abort signal to the subscriber station 41. The BBP 112 in the subscriber station 41 responds to the Abort signal by a performing a routine 143 that sends an Acknowledgment signal back to the station, and by then performing a routine 144 that tears down the given communication channel at the base station. The base station CCU 23 responds to the Acknowledgment signal from the subscriber station 41 by performing a routine 145 that tears down the given communication channel at the base station.

Prior to the expiration of the predetermined duration S defined by the routine 141 for timing the duration D of the routine 136 for determining whether a predetermined number "n" of successively determined offset values $\Delta t$ are below the predetermined value "U" (i.e. D<S), and prior to determining that a predetermined number "n" of successively determined offset values $\Delta t$ are below the predetermined value "U", the base station CCU 23 performs a routine 147 that transmits the determined offset value $\Delta t$ to the subscriber station 41.

The BBP 112 in the subscriber station 41 performs a routine 148 of computing the mean offset value (mean $\Delta t$) from the last "m" offset values $\Delta t$'s received from the base station (unless the offset value is unverified by being accompanied by an "Ignore FT" bit as described above). The BBP 112 further performs a routine 149 of determining whether a predetermined number "p" of received verified offset values $\Delta t$'s are within a predetermined tolerance "R" of the mean offset value (mean $\Delta t$) computed in accordance with the routine 148.

If the BBP 112 determines in accordance with the routine 149 that a predetermined number "P" of received verified offset values $\Delta t$'s are within the predetermined tolerance R of the mean offset value (mean $\Delta t$), the BBP 112 performs a routine 150 that adjusts the timing of the internal timing generator by the computed mean offset value (mean $\Delta t$).

If the BBP 112 determines in accordance with the routine 149 that a predetermined number "P" of received verified offset values $\Delta t$'s are not within a predetermined tolerance of the mean offset value (mean $\Delta t$), the BBP 12 performs a routine 151 of counting the number of such negative determinations, and when a predetermined count "Q" corresponding to a predetermined duration is reached, the BBP 112 performs the routine 150 of adjusting the timing of the internal timing generator by the computed mean offset value (mean $\Delta t$).

The subscriber communication system transports DC signaling information between the two-wire line interface 27 at the subscriber station 41 and the two-wire line appearance 26 at the central office 25. Information transferred in the "reverse channel" direction from the subscriber station 41 to the base station 104 includes changes in the supervisory state, dial pulse digits and switch hook flashes. Forward channel DC signaling supports features such as synchronous ring, distinctive ring and coin box operation.

It is desired to provide as much transparency as possible, within the limits of the TDM nature of the system. Signaling transparency can be measured by quantifying the following performance attributes: signaling path reliability; signaling delay; and signaling resolution.

To optimize these parameters, the system uses a waveform encoding scheme to digitally transfer DC signalling information from the subscriber station's line interface 27 to the central office's line appearance 26.

Changes in switch hook state are monitored by the baseboard processor 112 within the Subscriber Station 41. A timer interrupt within the baseband processor allows the switch-hook state to be sampled every 1.5ms, or 30 times per TDM frame. Each sample is stored as a single bit (on hook or off hook) in the switch-hook state buffer (SSB) 114. The SSB 114 contains 60 sample bits, though typically only about 45 of those bit positions are actively used. The remaining bits allow for an elastic buffer overflow capability. The nominal 45 bits provide a 67.5 ms window of switch-hook state information. The SCT 100 uses the SSB to determine changes in the supervisory state such as service requests, answer and disconnects. While a call is active, the SSB is also mounted for DC signaling events.

A DC signaling event can only occur during active voice operation. The SSB 114 is checked for events once per TDM frame (every 45 ms). An event is detected by the use of a cluster count. Starting at the 16th bit and running up to the 45th bit in the SSB 114, the cluster count is incremented for each onhook bit and decremented for each offhook bit. If the count reaches a threshold, defined by a terminal cluster count ($T_{cc}$), a DC signaling event is declared. The cluster count is not allowed to become negative or exceed $T_{cc}$. The cluster count is also maintained across frame boundaries, so that the stream of hook switch samples is viewed as a continueum.

The cluster count technique has the effect of detecting clusters of onhook states in the SSB 114 even in the presence of glitches. Hits are rejected, based on the choice of $T_{cc}$.

Once a DC signaling event is detected, the subsequent transmit burst is used as a control burst. Voice information in the burst is replaced with DC signaling information using the current voice modulation level. The oldest 30 bits of SSB data, representing 45 ms of switch-hook status, are encoded in the burst.

If consecutive DC signaling events are detected in the SSB 114, control bursts continue to be sent in consecutive frames. Upon occasion, one additional control burst is required following a sequence of one or more control bursts, even though no DC signaling event is declared in that frame. The only condition under which an additional control burst is required occurs when the previous control burst ended with an onhook bit, thereby leaving the base station 104 in an onhook state. If an additional control burst is required, the baseband processor 112 in the base station 104 must ensure that the last switch hook state is set to offhook so that the VCU 24 returns to the offhook state.

The first six words of each control block are dedicated to an arbitrary flag pattern. This flag pattern allows the control block to be detected during normal voice operation.

Following the flag pattern are 14 words of DC signaling data. The words are organized into seven sets, each set including of two words of information. The least significant bit of each word contains no information, and is arbitrarily set to zero. These bits can and should be used for error detection, however. The remaining 15 bits of each of the words in a set collectively contain 30 bits of switch-hook state information. The information is stored chronologically from the first word to the second word within the set and from the most significant to the least significant data bit within the words. To prevent false decisions due to repeated but incorrect patterns, each set is exclusive ORed with a unique bit pattern.

The receiving VCU 24 in the base station 104 determines the presence of a control block, as opposed to a voice block, by a simple majority vote decision on the flag pattern words at the head of the block. If the majority vote threshold is exceeded, the block is declared to be a control block. RELP synthesis is continued during control block processing and normal RELP data is replaced with RELP silence.

Once a control block is detected, the DC signaling state information it contains is also decoded using a simple majority vote decision. The exclusive-OR transformation must be removed prior to the majority vote operation. If the majority vote fails to exceed the voting threshold, the block is rejected and no change is made to the switch-hook state.

Once the 30-bit contents of the SSB 114 is decoded by the VCU 24, it is translated into T1 A/B signaling bits. In the case of two-wire switch-hook status, the 30 SSB bits correspond exactly to the required 30 bits of A-bit signaling data.

The T1 A-bits are placed in a first-in, first-out queue for transmission over a PCM highway to the base station 104. The corresponding MUX 19 provides the VCU 24 processor with an interrupt just prior to the A-bit T1 signaling frame, allowing the processor to inject the appropriate signaling bit in the correct PCM byte.

When no controls blocks arrive to refill the A-bit queue, the oldest state is repeated indefinitely. In the case of a DC signaling operation, the SCT 100 ensures that the last state in the SSB 114 is offhook.

Following a call setup, the CCU 23 in the base station 104 initializes the VCU 24 to the offhook state. In the case of call origination, the CCU 23 places the VCU 24 offhook just prior to the completion of refinement. In the case of call termination, the CCU 23 places the VCU 24 offhook after an answer is detected. Control bursts are not used for these supervisory state transitions.

Once voice operation is established, control bursts are used to transmit DC signaling events to the base station 104. If a disconnect is detected at the subscriber station 41, the base station VCU 24 signaling state is left onhook while the call is being cleared via an RCC Clear Request burst.

By choosing the DC signaling parameters appropriately, it is possible to adjust the system's performance. To aid in the detection and correction of errors, the flag pattern and SSB majority votes are taken on eight bit segments (aligned to byte boundaries). The majority vote on the flag pattern is taken over the entire 12 bytes. For the SSB 114, there are four independent majority votes, one for each byte it contains. If any one of the majority votes fail, then the entire majority vote is considered to have failed. The chosen parameter values are as follows:

Terminal Cluster Count—15
Flag Pattern Majority Vote—6 out of 12 (bytes)
SSB Majority Vote—4 out of 7 (bytes)

The selection of the terminal cluster count represents a tradeoff between hit rejection and the faithful reproduction of DC signaling pulses. The minimum significant onhook pulse duration is 29 ms onhook, produced by a 20 pulse per second dialer operating with a 58% break. With a terminal cluster count of 15, hits of less than 22.5±1.5 ms would be rejected. This rejection threshold is well below the required 29 ms, which corresponds to 18.5 sample times. The threshold also implies that a control block is only transmitted if at least 50% of the TDM frame is taken up with the handset being onhook. The 45 SSB bits contain 67.5 ms of signaling state information, providing 22.5 ms of look-ahead data for the buffer to make a "go/no go" decision. Without the look-ahead data, it would not always be possible to send leading switch-hook-transition bits in a timely manner.

The flag pattern threshold is central to avoiding false control block detections and missed control blocks. While undesirable, false control block detection during normal voice operation is not fatal to the system. A false detection only results in a 45 ms burst of silence and the remote possibility of some hits at the central office line appearance. Far less acceptable would be the loss of a control block, or worse yet a control burst, since this disrupts the subscriber's ability to perform signaling. With this in mind, the flag pattern threshold is set at six (fixed position) eight-bit (byte boundary) matches out of a possible 12. The probability of this occurring in random noise (RELP data appears like white noise) is $(2^{-6 \times 8}) \times (12$ choose $6)$ or $3.2 \times 10^{-12}$. With a block transmission period of 22.5 ms, such a match has an expected occurrence rate of once in 200 years of continuous voice operation. The analysis for control block loss is somewhat more difficult, particularly if the errors are assumed to be occur in bursts; but it is suggested that this direction scheme provides good reality.

The SSB majority vote threshold allows error correction within the signaling data. Since the DC signaling bits are stored in sets, corresponding SSB words are separated by many bit positions. This natural interleaving allows a burst error to obliterate three entire sets and still no corrupt majority vote.

The voice channels that allow acceptable voice quality will also provide very reliable DC signaling using this technique. The signaling resolution for the system is 1.5 ms. This correspoinds to T1 A/B signaling resolution and hence represents an acceptable level. The signaling delay through the system is approximately 80 ms. This delay is made up of the 67.5 ms SSB window, a six millisecond transmission time and base station processing time. These measures make the system DC signaling transparency comparable to existing digital loop carrier systems.

In like manner DC signalling information can be transferred from a line appearance 26 at the base station 104 to the line interface 27 at the subscriber station 41.

The general routines performed by the base station 104 and the subscriber station 41 to detect and transmit DC signalling information over a communication channel assigned as a voice channel are summarized with reference to FIG. 4. The originating station 155 referred to in FIG. 4 is either the base station 104 or the subscriber station 41 in accordance with the site of origination of the DC signalling information, and the receiving station 156 is the other of such two stations.

The originating station 155 performs a routine 158 of monitoring signals on the line appearance/interface; performs a routine 159 of buffering the signals monitored in accordance with the routine 158; performs a routine 160 of detecting DC signaling information from the signals buffered in accordance with the routine 159; performs a routine 161 of conditioning the detected DC signaling information for communication over the assigned channel in lieu of voice data signals by formatting the detected DC signaling information as a control block having a flag pattern in addition to DC signaling data; and performs a routine 162 of transmitting the control block as a control signal burst in the assigned communication channel in lieu of voice information.

The receiving station 156 performs a routine 166 of determining the presence of a control block in a signal burst received over the assigned communication channel by recognizing the flag pattern in the signal burst. The receiving station 156 then performs a routine 167 of reformatting the DC signaling information in the control block to a standard DC signalling format for transfer to the line appearance/interface. Finally the receiving station 156 performs a routine 168 of transferring the reformatted DC signalling information to the line appearance/interface at the receiving station 156.

We claim:

1. A subscriber communication system, including a plurality of base stations, each in a separate network, the base station in each network being in selective communication with a plurality of subscriber stations and having means to transmit control information to its subscriber stations over a radio control channel (RCC) at a frequency selected by the base station from a plurality of predetermined frequencies;
   each base station including means for transmitting over the RCC both control messages to the subscriber stations in its network and a network number unique to that base station; and
   each subscriber station in each network including means for receiving the network number from any base station in the system over its respective RCC to enable that subscriber station to determine whether it is in the same network as a particular base station having a particular network number.

2. A system according to claim 1,
   wherein each subscriber station includes means for searching for the RCC frequency by sequentially transmitting an RCC acquisition message at each of the predetermined frequencies, with each of the acquisition messages including an identification number that is unique to the subscriber station; and
   wherein the base station includes
   means for processing the subscriber identification number in a said acquisition message received over the RCC to determine whether the subscriber station is in the same network as the base station; and
   means for transmitting an acknowledgement to the subscriber station that the RCC has been acquired by the subscriber station when said processing of the subscriber identification number indicates that the subscriber station is in the same network as the base station.

3. A subscriber communication system including a plurality of base stations, each in a separate network, the base station in each network being in selective communication with a plurality of subscriber stations and having means to transmit control information to its subscriber stations over a radio control channel (RCC) at a frequency selected by the base station from a plurality of predetermined frequencies
   each base station, including
   a master clock for providing a system timing signal; and
   each subscriber station including
   an internal timing generator for generating a subscriber station timing signal for timing the signals that are transmitted over a given communication channel from each subscriber station to a base station; and
   means for providing a refinement signal timed by the subscriber station timing signal;
   means operable upon initial establishment of a communication channel between a base station and a subscriber station for transmitting the refinement signal over the respective communication channel from the subscriber station to the base station;
   wherein each base station further includes
   means for processing the refinement signal received from a subscriber station in relation to the system timing signal to determine the value of any offset between the timing of the system timing signal and the timing of the refinement signal;
   means for communicating the determined offset value to the subscriber station; and
   wherein the subscriber station further includes
   means coupled to the internal timing generator for processing the offset value communicated from the base station to adjust the subscriber station timing signal to reduce said offset.

4. A communication system according to claim 3,
   wherein the subscriber station refinement signal transmitting means transmits successive frames of refinement signal bursts;
   wherein the base station processing means determines an offset value for each received refinement signal burst; and
   wherein the subscriber station processing means processes a predetermined number of successively received offset values to adjust the timing of the subscriber station timing signal.

5. A subscriber communication system according to claim 4, wherein each base station includes means for terminating communication of said predetermined offset values when a predetermined number of successively determined offset values are below a predetermined value.

6. A subscriber communication system according to claim 5,
   wherein the base station communicating means communicates a stop refinement signal to the subscriber station when a predetermined number of successively determined offset values are below a predetermined value; and
   wherein the subscriber station refinement signal transmitting means responds to receipt of the stop refinement signal by ceasing to transmit the refinement signal.

7. A subscriber communication system according to claim 6,
   wherein the subscriber station responds to receipt of the stop refinement signal by enabling normal communications over the given communication channel at the subscriber station.

8. A subscriber communication system according to claim 4, wherein the base station includes means for tearing down the given communication channel when said determined offset values remain above a predetermined value for a predetermined duration.

9. A subscriber communication system according to claim 8,
   wherein the base station communicating means communicates an abort signal to the subscriber station when said determined offset values remain above the predetermined value for a predetermined duration;
   wherein the subscriber station responds to receipt of the abort signal by sending an acknowledgment signal to the base station and by tearing down the given communication channel at the subscriber station; and wherein the base station responds to receipt of the acknowledgment signal by tearing down the given communication channel at the base station.

10. A subscriber communication system according to claim 4, wherein the subscriber station processing means computes a mean offset value from the predetermined number of processed offset values and provides the computed mean offset value to adjust the subscriber station internal timing signal generator when the predetermined number of processed offset values are within a predetermined tolerance of the computed mean offset value.

11. A subscriber communication system according to claim 10, wherein the subscriber station processing means provides the computed means offset value to adjust the subscriber station internal timing signal generator after a predetermined duration when the predetermined number of processed offset values are not within the predetermined tolerance of the computed mean offset value.

12. A subscriber communication system including a plurality of base stations, each in a separate network, the base station in each network being in selective communication with a plurality of subscriber stations and having means to transmit control information to its subscriber stations over a radio control channel (BCC) at a frequency selected by the base station from a plurality of predetermined frequencies wherein voice data signals are communicated over an assigned channel between a line appearance that couples a base station to a central office and a line interface that couples a subscriber station to a subscriber terminal, at a base station, each base station being coupled to a line appearance for providing an assigned channel for communicating voice data signals between the line appearance and a subscriber station;

each subscriber station being coupled to a line interface for providing an assigned channel for communicating voice data signals between the line interface and the base station; and means for processing DC signaling information for communication over the assigned channel between the line appearance and the line interface.

13. A system according to claim 12, wherein the processing means comprise means for detecting DC signaling information on the line appearance and/or on the line interface;

means for conditioning the detected DC signaling information for communication over the assigned channel in lieu of the voice data signals.

14. A system according to claim 13, wherein the voice data signals are communicated over the assigned channel in signal bursts;

wherein the means for detecting the DC signaling information on the line interface comprises means in the subscriber station for monitoring signals on the line interface;

means in the subscriber station for buffering the monitored signals; and means in the subscriber station for processing the buffered signals to detect DC signaling information; and wherein the means for conditioning the detected DC signaling information comprises means in the subscriber station for transmitting the detected DC signaling information over the assigned channel as a control block in a control-signal burst having the same format as a said voice-data-signal burst.

15. A system according to claim 14, wherein the control block includes a flag pattern identifying the block as a control block and further includes the DC signaling information; and wherein the base station further comprises means for determining the presence of a control block in a signal burst received from the subscriber station over the assigned channel by recognizing the flag pattern; and means responsive to recognition of the flag pattern for reformatting the the DC signaling information in the control block to a standard DC signaling information format for transfer to the line appearance.

16. A system according to claim 13, wherein the voice data signals are communicated over the assigned channel in signal bursts;

wherein the means for detecting the DC signaling information on the line appearance comprises means in the base station for monitoring signals on the line appearance;

means in the base station for buffering the monitored signals; and means in the base station for processing the buffered signals to detect DC signaling information; and wherein the means for conditioning the detected DC signaling information comprises means in the base station for transmitting the detected DC signaling information over the assigned channel to the subscriber station as a control block in a control-signal burst having the same format as a said voice-data-signal burst.

17. A system according to claim 16, wherein the control block includes a flag pattern identifying the block as a control block and further includes the DC signaling information; and wherein the subscriber station further comprises means for determining the presence of a control block in a signal block received from the base station over the assigned channel by recognizing the flag pattern; and means responsive to recognition of the flag pattern for reformatting the the DC signaling information in the control block to a standard DC signaling information format for transfer to the line interface.

* * * * *